July 25, 1961 P. L. WILCOX 2,993,294
SELF-FEEDING HAND SPRAYER FOR FINELY DIVIDED MATERIALS
Filed May 9, 1958 2 Sheets-Sheet 1

INVENTOR.
PIERCE L. WILCOX,
BY
McMorrow, Berman + Davidson
ATTORNEYS.

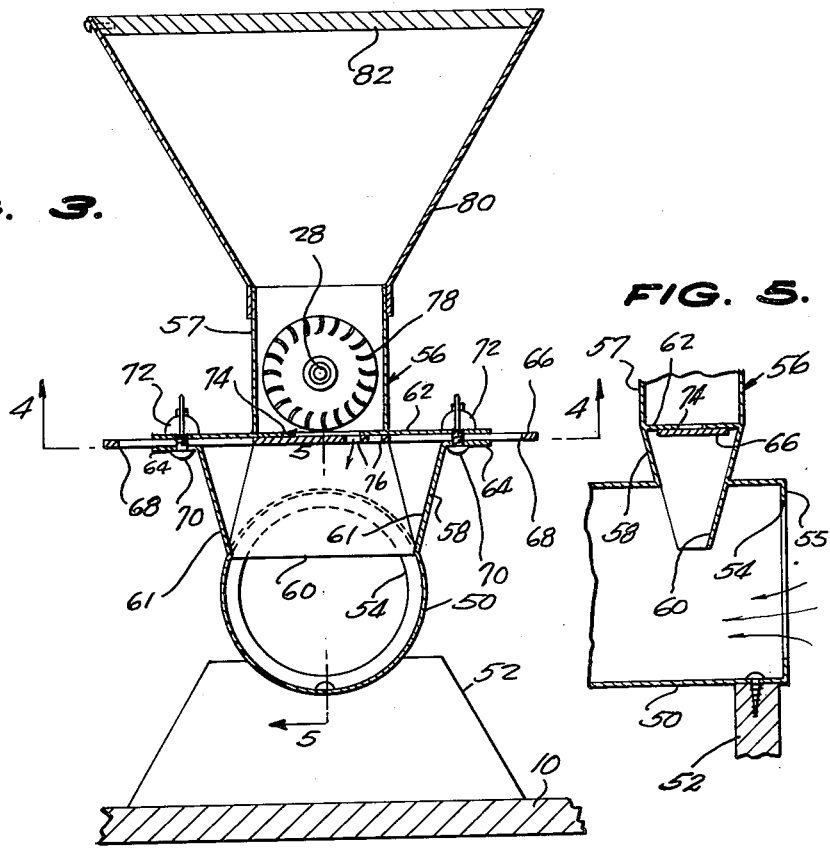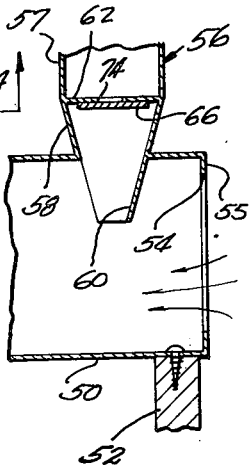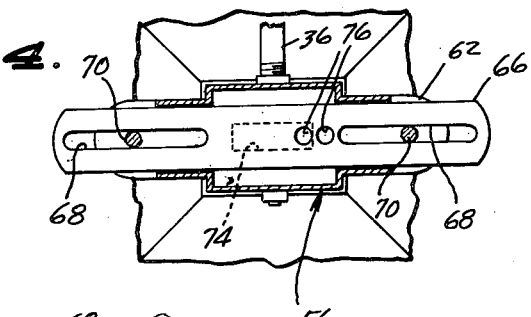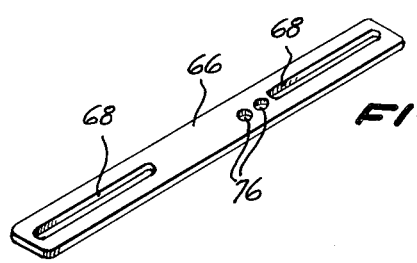

United States Patent Office 2,993,294
Patented July 25, 1961

2,993,294
SELF-FEEDING HAND SPRAYER FOR FINELY
DIVIDED MATERIALS
Pierce L. Wilcox, 1435 Emile St., Beaumont, Tex.
Filed May 9, 1958, Ser. No. 734,162
2 Claims. (Cl. 43—148)

This invention relates generally to sprayers or distributing apparatus for various finely divided materials, such as insecticides in the form of powder. The invention is intended mainly for use in the distribution of insecticides of this type, and will hereinafter be described with particular reference to said use. However, this is not to be considered as unduly restrictive of the protection sought for the invention and quite possibly, the device may have other uses.

Large dusting apparatus is of course well known, being used for spraying insecticides that are in the form of finely divided materials. However, such apparatus is not usable to advantage in situations in which the apparatus must be moved into a relatively inaccessible area, and in which concentrations of the insecticide must be accurately distributed. A large, heavy apparatus cannot be freely moved about, and of course is totally unsuitable in a situation such as mentioned.

Reference is here had mainly to situations such as that encountered by companies in the field of pest extermination, which companies are concerned with the extermination of insects of various kinds in and about houses, garages, small business places, etc. Often, a sprayer must be operated in a low crawl space under a house, or in the attic of a house, and obviously, heavy apparatus cannot be moved to these locations.

In view of the difficulties which have heretofore persisted, it is the main object of the present invention to provide a self-feeding, electrically operated spraying device, which is manually controllable and which is intended particularly for use in dusting powdered chemical compounds in areas that cannot be normally handled by heavy duty, large spraying devices.

It is a further object of the invention to provide a light, portable spraying device of the type stated that will nevertheless have the capacity of spraying a substantial quantity of a selected chemical in a comparatively short time, thus to permit the expeditious completion of a particular exterminating operation so that it can be performed for profit.

Another object is to provide a device of the character stated which will handle the compound from a hopper, in a continuous feed, without possibility of "bridging" of the material within the hopper in a manner that would halt the flow thereof.

Another object is to provide an accurate control as to the amount that is fed through the device for spraying.

Another object is to provide a spraying device of the character stated which will incorporate a coactive relationship of an agitating means at the outlet of the hopper, a gauge slide for controlling the amount fed from the hopper, and an air duct in which there is a suction, said air duct being disposed to receive the material from the hopper after passage through the agitator, for discharge of the material in a spray or dust.

Another object is to provide a machine of the type stated which will incorporate desirable safety features for the operator.

Other objects will appear from the following description, the claims appended thereto, and from the annexed drawing in which like reference characters designate like parts throughout the several views and wherein:

FIGURE 3 is a transverse sectional view substantially on line 3—3 of FIGURE 1;

FIGURE 4 is an enlarged horizontal section through the gauge slide assembly, on line 4—4 of FIGURE 3;

FIGURE 5 is a fragmentary longitudinal sectional view on line 5—5 of FIGURE 3; and FIGURE 6 is an enlarged perspective view of the slide element on the gauge slide assembly.

Figure 2:
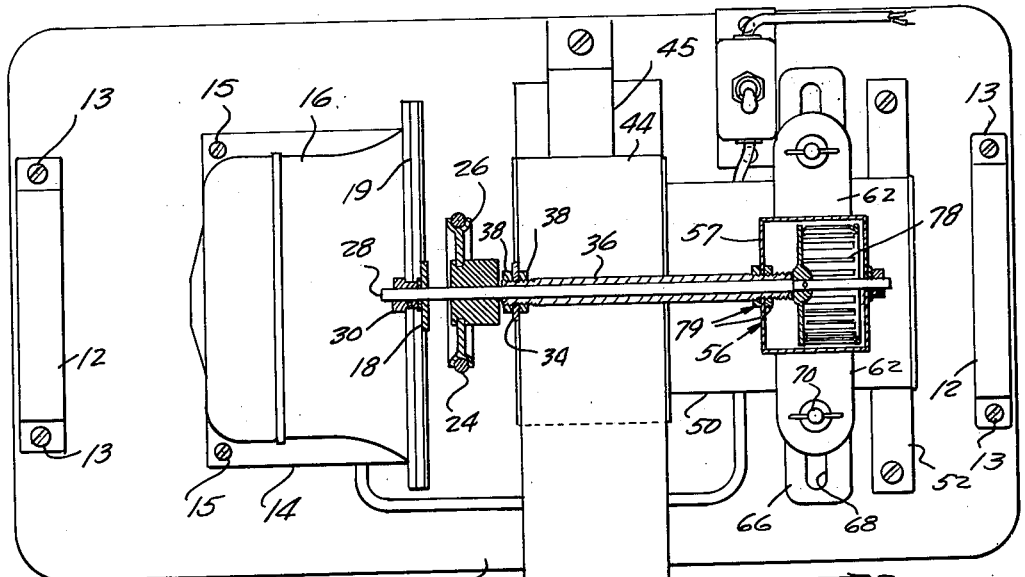
FIGURE 2 is a horizontal sectional view substantially on line 2—2 of FIGURE 1.
Figure 1:
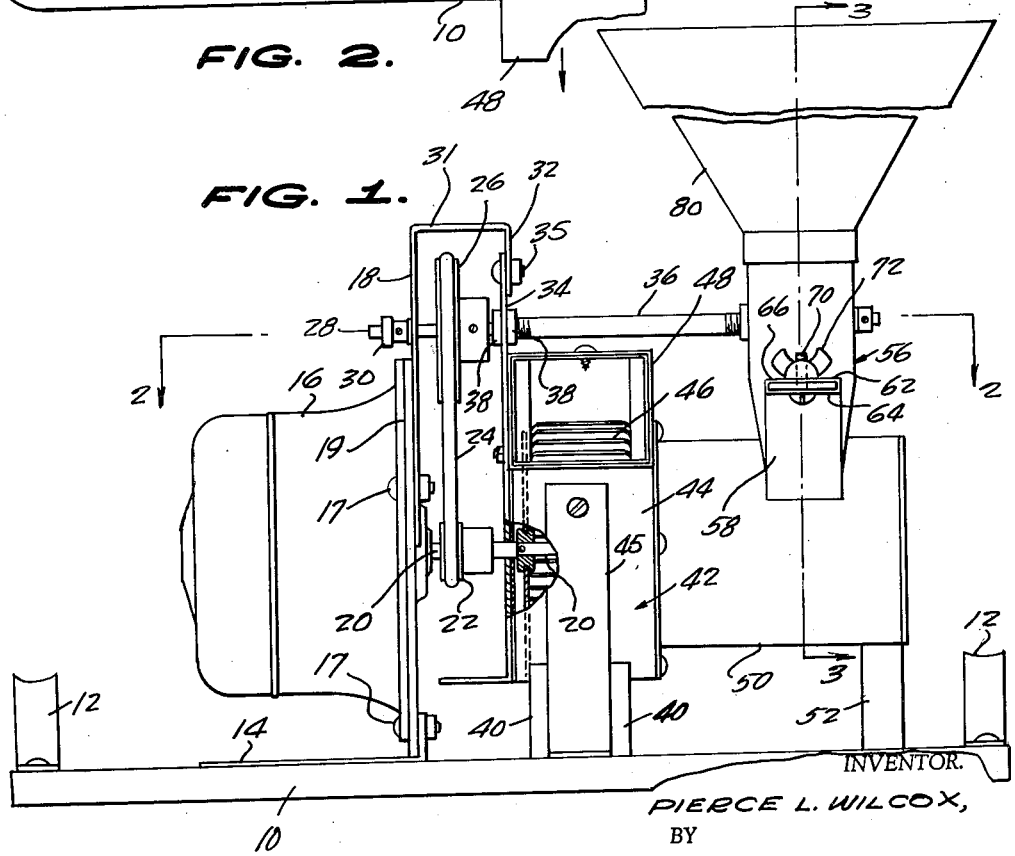
FIGURE 1 is a side elevational view of a spraying apparatus, according to the present invention, portions being broken away.

Referring to the drawing in detail, the device constituting the present invention includes a flat, rectangular base plate 10, having at its opposite ends upwardly, arcuately bowed handles 12 fixedly secured to the base plate by means of the screws 13 or equivalent fastening elements.

Designated at 14 is a motor support bracket, of plate-like form, fixedly secured by screws 15 to the base plate in closely spaced relation to one end of the base plate. A motor 16 is bolted at 17 to an upstanding motor support plate 19 of the bracket. Any of various other means could be employed, of course, for mounting the motor.

Designated at 18 is an upwardly projecting bearing plate, fixedly secured to and extending upwardly from the motor mounting plate 19.

The shaft 20 of the motor projects forwardly above base plate 10, and connected to shaft 20 for rotation thereby is a drive pulley 22 about which is trained a belt 24, extending upwardly and trained about a larger driven pulley 26 connected to a driven shaft 28 for rotation therewith. Shaft 28 at one end is journaled in a bearing 30 carried by bearing plate 18. Bearing plate 18 is of inverted J shape, having a horizontally disposed bight portion 31 merging into a depending, short leg 32 to which is connected a shaft support bracket 34 of L shape, by means of bolt 35 or the like.

An elongated bearing sleeve 36 (see FIGURE 2) is threaded at its opposite ends, and at one end extends through an opening of the shaft support bracket 34. Nuts 38 are threaded on this end of sleeve 36, against opposite faces of said plate 34. Shaft 28 is journaled in sleeve 36, projecting beyond the opposite ends thereof.

Designated at 40 is a base of a blower generally designated 42, which includes a generally circular housing 44 supported upon the base and engaged against vibratory movement by side brackets 45, said brackets being L shaped and being secured at their opposite ends to the plate 10 and the sides of the housing 44.

Rotating within the housing 44 is a centrifugal fan of the "squirrel cage" type designated 46 and connected to the shaft 20 of the motor. Thus, fan 46 is driven directly from the motor, turning at the same speed as the shaft 20 of the motor. Shaft 28, however, is driven at a slower speed, through the belt and pulley means 22, 24, 26.

Designated at 48 is the outlet of the blower 42, and the material being sprayed is blown at substantial velocity through said outlet in the direction of the arrows shown in FIGURE 2. Obviously, a suitable hose or other means can be connected to the outlet, which would be of flexible formation so as to be locatable wherever desired to insure accurate control of the sprayed material.

Communicating with blower housing 44, at one side thereof, is a horizontally extending, large diameter conduit 50, supported upon brackets 52 mounted upon base plate 10. Conduit 50 communicates with the center portion of the blower housing, so that when the fan is operated, a suction is created at the center of the fan, drawing into the fan air that is in the conduit 50, in which air there would be entrained the finely divided materials that are to be sprayed.

Referring to FIGURE 3, the end of the conduit remote from the housing 44 has a large diameter air inlet opening 54, bounded by an inwardly directed circumferential flange 55. Adjacent said inlet end of the conduit (see FIGURE 5) there is a combined hopper and agitator assembly generally designated 56. This includes a rectangular, vertically extending agitator housing 57 disposed above cylinder or conduit 50 and comunicating with the cylinder through the medium of a specially shaped connecting duct 58 that constitutes a gauge slide support. The connecting duct 58 tapers in a downward direction, that is, the front, back, and side walls of the connecting duct all converge in a downward direction as shown in FIGURES 3 and 5.

Due to this arrangement, all material gravitating from the relatively small, rectangular agiator housing will be caused to drop into the large diameter conducit 50. In this connection, as will be seen in FIGURE 5, the duct 58 has a back wall 60 which projects downwardly below the top of the conduit 50, with the back wall 60 having a bottom edge extending as a chord fully across the conduit above the center or longitudinal median line of the conduit. The front wall of the duct 58, however, terminates at the circumference of the conduit 50. The downwardly convergent side walls 61 of the duct 58 intersect the horizontal bottom edge of back wall 60 at the circumference of the conduit 50. The result is that any material dropping downwardly from the agitator housing will be deflected forwardly at it passes out of the duct 58, being thus given an impetus in the direction in which air is moving through the duct.

Agitator housing 57 is formed with a flat bottom wall 62, extending laterally in opposite directions in closely spaced, overlying relation to laterally outwardly projecting extensions 64 formed on the upper ends of the side walls 61 of duct 58. An elongated, flat slide 66 has in its end portions longitudinally and centrally extending guide slots 68, receiving the shanks of bolts 70 on which are threaded wing nuts 72 bearing against the lateral extensions of bottom wall 62. Intermediate its ends, slide 66 has closely spaced openings 76 adjacent the inner ends of one of the slots 68 (see FIGURE 6), and one or both of said openings may be moved into registration with a large, rectangular aperture 74 formed in the bottom wall 62 centrally thereof (FIGURE 4).

Slide 66 can be moved to a fully closed position with both openings 76 out of registration with opening 74. In these circumstances no material will flow downwardly into the conduit 50. Or, the slide can be moved to any of various open positions, such as a position in which one opening 76 registers with opening 74 as in FIGURE 3. Or, both openings 76 can be registered, or perhaps part of one opening. One might have one opening 76 fully exposed and the other one only partially exposed.

An agitator 78 is the squirrel-cage blower type, and is connected to the shaft 28 for rotation therewith (see FIGURE 2). Sleeve 36, as seen in FIGURE 2, forms an abutment for one side of agitator 78, and nuts 79 are threaded on sleeve 76 against opposite faces of the front wall of the agitator housing 57.

A hopper 80 is of downwardly tapering formation, being connected at its lower, discharge end to the upper end of the agitator housing. The hopper may be closed by a cover plate 82.

The device constituting the present invention comprises a light, compact, readily portable, self-feeding spraying device particularly adapted for spraying in duct form powdered insecticides or other finly divided materials. The device can be controlled to cover the amount of materials sprayed. In operation, of course, the agitator and the suction fan are simultaneously driven, at different speeds. Operation of the suction fan sets up a suction within conduit 50, drawing air through the inlet 54 past the lower end of the agitator and hopper assembly 56. Meanwhile, the agitator is causing the self-feeding of materials from the hopper in a selected amount controlled by selected positioning of the slide 66. There is no possibility at any time of bridging of the material at any time that the suction fan is in operation. As long as the suction fan is working, and there is material within the hopper 80, material will be drawn through the conduit 50, becoming entrained in the air passing therethrough. The centrifugal fan 46 will then cause said material to be forced outwardly through the duct 48. There is thus no possibility of the compound "hanging up" or "bridging" in the hopper.

It is believed apparent that the invention is not necessarily confined to the specific use or uses thereof described above. Since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A sprayer for finely divided material comprising a support, a horizontal axis blower having a housing provided with an outlet, a relatively large diameter cylindrical conduit having an end connected to one end of the blower housing and being open at its other end, a transversely elongated rectangular housing extending across the top of said conduit, said rectangular housing being longer than the width of the conduit and being downwardly tapered, said rectangular housing having a relatively large open upper end and a smaller lower end opening into the top of the conduit, an upstanding agitator housing on the upper of the rectangular housing, said agitator housing having a bottom wall closing the upper end of the rectangular housing, said agitator housing being substantially smaller in horizontal cross section than said rectangular housing, said bottom wall being formed with opening means, and a slidable valve plate working across the upper end of the rectangular housing and engaged with the underside of said bottom wall, said valve plate having opening means registrable with the opening means in the bottom wall, and a horizontal axis rotary agitator positioned in said agitator housing.

2. A sprayer for finely divided material comprising a support, a horizontal axis blower having a housing provided with an outlet, a relatively large diameter cylindrical conduit having an end connected to one end of the blower housing and being open at its other end, a transversely elongated rectangular housing extending across the top of said conduit, said rectangular housing being longer than the width of the conduit and being downwardly tapered, said rectangular housing having a relatively large open upper end and a smaller lower end opening into the top of the conduit, an upstanding agitator housing on the upper of the rectangular housing, said agitator housing having a bottom wall closing the upper end of the rectangular housing, and means operatively connecting the agitator to the blower.

References Cited in the file of this patent

UNITED STATES PATENTS

| | | |
|---|---|---|
| 256,027 | Morgan | Apr. 4, 1882 |
| 1,107,015 | Babcock et al. | Aug. 11, 1914 |
| 1,229,994 | WcWhorter | June 12, 1917 |
| 1,420,601 | Wright | June 20, 1922 |
| 1,637,652 | Ness | Aug. 2, 1927 |
| 1,674,048 | Lang | June 19, 1928 |
| 1,750,147 | Wright | Mar. 11, 1930 |
| 1,858,090 | Hull | May 10, 1932 |